United States Patent [19]
Semrad et al.

[11] Patent Number: 5,822,136
[45] Date of Patent: Oct. 13, 1998

[54] FRICTION CONNECTOR FOR OPTICAL FLATS IN INTERFEROMETERS

[75] Inventors: James V. Semrad, Tucson, Ariz.; Reuben Hale, Oakland, Calif.

[73] Assignee: Wyko Corporation, Tucson, Ariz.

[21] Appl. No.: 771,280

[22] Filed: Dec. 20, 1996

[51] Int. Cl.[6] .................................................. G02B 7/02
[52] U.S. Cl. .......................................... 359/818; 359/819
[58] Field of Search .................................... 359/818, 819, 359/804, 809, 811

[56] References Cited

U.S. PATENT DOCUMENTS

| | | | |
|---|---|---|---|
| 2,905,054 | 9/1959 | Logan | 359/819 |
| 4,268,123 | 5/1981 | Mesco | 359/819 |
| 5,396,487 | 3/1995 | Abe et al. | 359/819 |
| 5,457,577 | 10/1995 | Wilson | 359/827 |
| 5,488,514 | 1/1996 | Bruning et al. | 359/811 |
| 5,642,235 | 6/1997 | Ichikawa | 359/811 |

FOREIGN PATENT DOCUMENTS

| | | | |
|---|---|---|---|
| 60-88914 | 5/1985 | Japan | 359/819 |

*Primary Examiner*—Georgia Y. Epps
*Assistant Examiner*—Ricky Mack
*Attorney, Agent, or Firm*—Antonio R. Durando

[57] ABSTRACT

A pair of rigid connectors is disposed in frictional arrangement between an optical flat and its supporting cell joined by resilient connectors. The first, axial connector consists of a block anchored to the cell's inner surface and tilted by a spring so that a line contact is established between the block and the flat's peripheral surface. The second, radial connector consists of a flat clip overlapping the gap between the optical flat and the cell, so that surface contacts are established between the clip and the side surfaces of both structures. Another, retaining spring coupling the first and second connectors ensures that such surface contacts are maintained. The frictional forces resulting from these connections prevent the axial and radial movement of the flat with respect to the cell when either component is subjected to vibrations under normal operating conditions. At the same time, this arrangement allows relative shifts between the flat and the cell caused by thermal effects to occur without producing mechanical stresses on the optical flat.

21 Claims, 6 Drawing Sheets

FRICTION CONNECTOR FOR OPTICAL FLATS IN INTERFEROMETERS

BACKGROUND OF THE INVENTION

1. Field of the Invention

This invention pertains in general to the field of interferometry and, in particular, to a novel device for reducing vibrations of optical flats in interferometers without causing distortion of the optical surfaces.

2. Description of the Related Art

Optical surface profilers based on phase-shifting and vertical-scanning interferometry utilize transmission and return flats mounted on metallic frames or cells which, in turn, are assembled into the optical components of the instrument. It is very critical that distortions of the flats due to mechanical stresses be minimized and that system vibrations be quickly attenuated during the course of interferometric measurements. In order to eliminate stresses due to thermal-expansion differences in the materials constituting the flat and the cell, the two are typically connected by means of inserts or bonds with complementary thermal expansion characteristics. To reduce vibrations to an acceptable level, the instrument is typically operated on an optical table, such as marketed by the Newport Company of Fountain Valley, Calif., provided with shock absorbers capable of rapidly dampening all vibrations introduced in any part of the equipment. Thus, any vibration in the cell is rapidly absorbed and attenuated by this dampening table.

Figure 1:
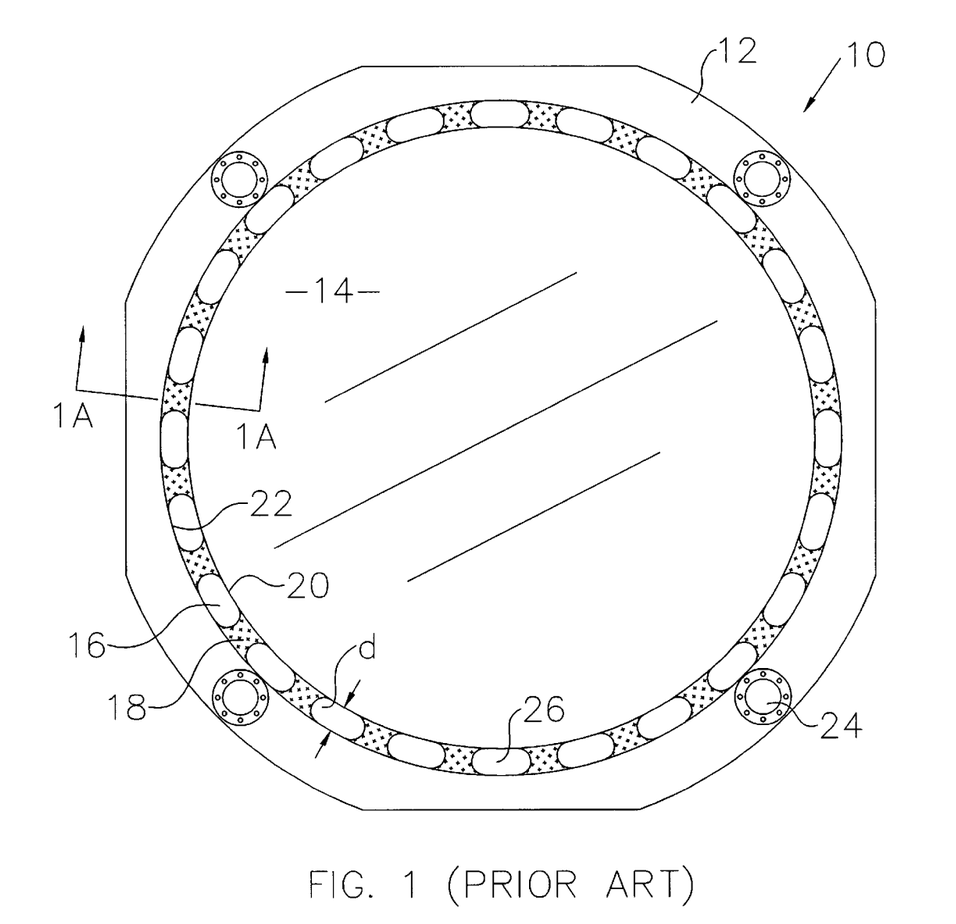
FIG. 1 is a plan view of a flat-cell assembly of interferometric apparatus according to the prior art where the cell and flat are connected by resilient bonds evenly distributed along an annular gap between the two.
Figure 1A:
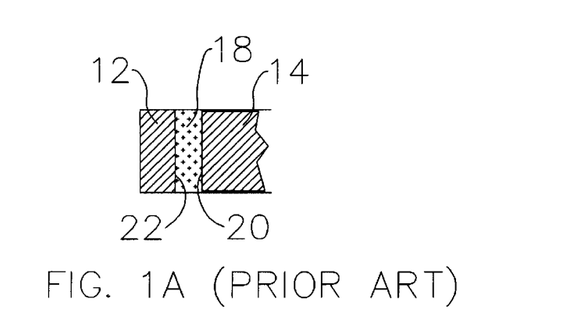
FIG. 1A is a partial section taken along line 1A—1A in FIG. 1 to illustrate the resilient-bond connection between the flat and the cell.

Referring to the drawings, wherein like parts are designated throughout with like numerals and symbols, FIG. 1 illustrates in plan view a prior-art flat cell 10 constructed according to these characteristics. A substantially annular cell 12, typically made of aluminum or other metal with a well defined thermal expansion coefficient, is used to rigidly support an optical flat 14, which is normally in the shape of a disk conforming to a circular opening 16 in the cell 12. The flat 14, which may be a highly transparent transmission flat or a highly reflective return flat, is supported in the frame 12 by means of multiple bonds 18 adhering to the outer peripheral surface 20 of the flat 14 and the conforming inner annular surface 22 of the cell 12. We found that RTV (room temperature vulcanized) rubber formed in place to adhere to surfaces coated with a suitable primer is optimal material for the bonds 18. Thus, the flat cell 10 constitutes a rigid assembly that is attached to the optical components of the interferometer by means of appropriate mounting points 24.

The glass making up transmission or return flat 14 consists of fused silica which has a negligible thermal expansion coefficient (about $0.52 \times 10^{-6}/°$ C.) within the temperature range of operation of normal interferometer applications (that is, within approximately 10° C. of room temperature). On the other hand, the metallic cell 12 has an appreciable thermal expansion coefficient; for example, $23.8 \times 10^{-6}/°$ C. for aluminum. Therefore, in order to avoid mechanical stresses caused by this difference in thermal characteristics that might deform the flat 14 and affect its optical characteristics, the flat cannot be connected directly to the cell 12. Rather, the bonds 18 are utilized to provide a rigid connection between the flat 14 and the cell 12 with a material that is able to absorb the relative movement between the two when the assembly is subjected to thermal effects.

In practice, the material constituting the bonds 18 and the uniform spacing or gap d between the flat 14 and the cell 12 are selected such that any change in the spacing d due to a temperature variation is substantially the same as the corresponding thermal expansion (or contraction) of the bonds 18. For example, for a flat-cell assembly with a spacing d of about 27.5 mm, a cell 12 with a 647.7-mm diameter and an 82.5-mm thickness made of fused silica having a thermal coefficient of $0.53 \times 10^{-6}/°$C., bonds 18 made of RTV rubber with a thermal coefficient of $295.0 \times 10^{-6}/°$ C., a substantially perfect balance is achieved that reduces thermal stresses to the flat to negligible, and therefore acceptable, proportions.

Having thus solved the problem of minimizing thermal effects on the optical flat of the instrument, a problem related to flat vibrations remains because of the relative resilience of the bonds 18. As a result of the relative lack of stiffness in the connection between the cell 12 and the flat 14, any motion of the cell 12, such as during shifting for measurement purposes, produces a transient acceleration and a corresponding vibration in the flat that is not readily attenuated by the optical table's shock absorption system. The elasticity of the inserts 18 prevent, the rigid response required for the dampening system to control vibrations of the flat 14. Accordingly, there still is a need for a device and method for coupling the flat to the cell that produce a rigid connection that is substantially free from thermal effects and that does not cause distortions of the optical surfaces.

BRIEF SUMMARY OF THE INVENTION

The main goal of this invention is a connection between the optical flat and the supporting cell of interferometric apparatus such that a stiff assembly is produced whereby any motion of the cell is accompanied by an immediate, vibration-free, corresponding motion of the flat without distortion of the optical surfaces.

Another important objective is a coupling mechanism that is complementary to the resilient bonds used in prior art to couple optical flats to their supporting cells in a thermally stable arrangement.

Another goal is a mechanism and coupling method that will produce a sufficiently stiff connection between an optical flat and a cell connected by resilient bonds such that rapid dampening of flat vibrations can be achieved through a mechanical shock absorbing system connected to the cell.

Finally, another objective is a mechanism that is suitable for direct incorporation with the flat cells of existing interferometric surface profilers.

Therefore, according to these and other objectives, the present invention consists of a pair of rigid connectors disposed in frictional arrangement between the optical flat and its supporting cell joined by resilient connectors. A first, axial connector consists of a block anchored to the cell's inner surface and tilted by a spring so that a line contact is established between the block and the flat's peripheral surface. A second, radial connector consists of a flat clip overlapping the gap between the optical flat and the cell, so that surface contacts are established between the clip and the side surfaces of both structures. Another, retaining spring coupling the first and second connectors ensures that such surface contacts are maintained. The frictional forces resulting from these connections prevent the axial and radial movement of the flat with respect to the cell when either component is subjected to vibrations under normal operating conditions. At the same time, this arrangement allows relative shifts between the flat and the cell caused by thermal effects to occur without producing mechanical stresses on the optical flat.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENT OF THE INVENTION

The heart of this invention lies in the idea of creating a frictional connection between an optical flat and a cell coupled by resilient means in order to prevent relative shifts between the two caused by vibrations of either structure while permitting movements caused by thermal effects. The method and apparatus of the invention are particularly directed to improve prior-art connections between optical flats and cells that include resilient means with predetermined thermal characteristics provided to eliminate thermal and mechanical stresses on the optical flat.

Figures 2, 2A:
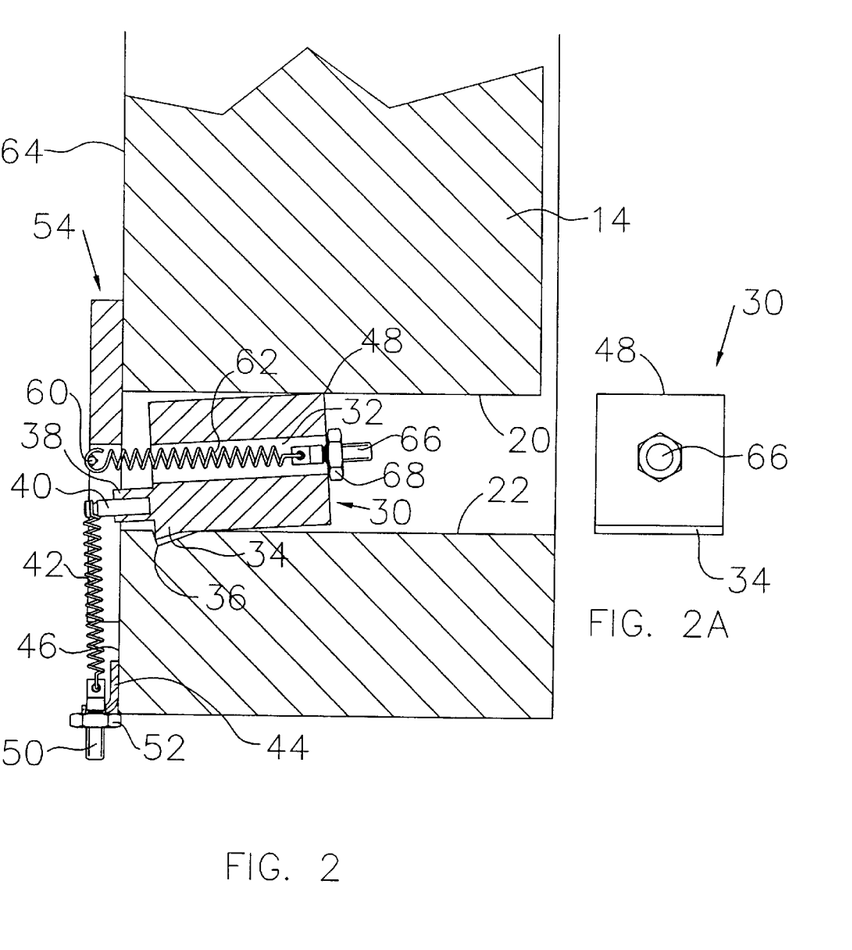
FIG. 2 is an enlarged partial cross-section illustrating the device of the invention coupling a conventional optical flat to a surrounding supporting cell.
FIG. 2A is a bottom plan view of the block seen in FIG. 2.
Figure 3:
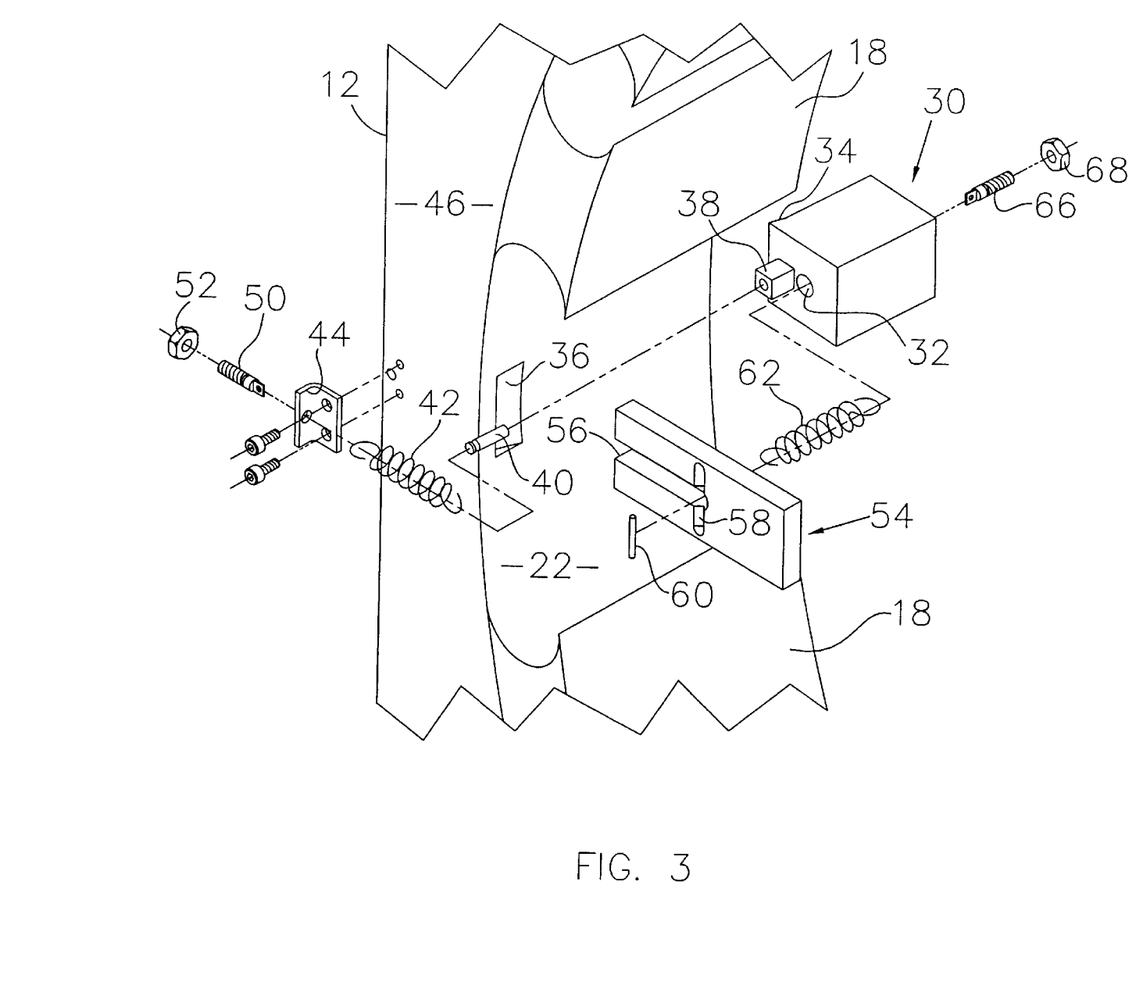
FIG. 3 is an exploded perspective view of the various components of the invention shown with a corresponding section of supporting cell.

Referring again to the drawings, FIG. 2 is an enlarged partial cross-section illustrating the device of the invention coupling a conventional optical flat to a surrounding supporting cell. The first friction connector consists of a block 30 with a substantially rectangular cross-section and a longitudinal perforation 32 along the main axis of the block. A bottom plan view of the block 30 is shown in FIG. 2A. The friction block 30 is positioned in the gap 26 (see FIG. 1) between the annular structure of the cell 12 and the optical flat 14 supported by multiple resilient bonds 18. The side of the block 30 facing the inner surface of the cell 12 includes a protruding lip 34 adapted to fit into a conforming retaining groove 36 in the inner annular surface 22 of the cell. The block 30 also includes a substantially cylindrical longitudinal protrusion 38 for housing a spring-retaining post 40. The various parts are illustrated in greater detail in the exploded view of FIG. 3.

The block 30 is pressed against the outer surface 20 of the optical flat 14 by the action of an extension spring 42 coupling the post 40 to a bracket 44 in the side surface 46 of the cell 12, thereby establishing a line contact and a frictional connection between the edge 48 of the block and the optical flat 14. Thus, the pulling action of the spring 42 causes the block 30 to pivot around the lip 34 nested in the groove 36 and tilt the block to engage the outer surface 20 of the flat. A threaded post 50, to which the spring 42 is anchored, and a mating nut 52 are provided to adjust the tension of the spring 42 and, correspondingly, to vary the pressure and frictional forces between the block 30 and the flat 14. It is understood that the size of the block 30 is chosen such that it can fit freely within the gap 26 within the entire temperature range of operation and yet readily engage the surface of the optical cell when the spring 42 is connected to the post 40. Thus, the block 30 provides a frictional connection that prevents axial shifts between the cell 12 and flat 14 under vibrations caused by normal operating conditions. On the other hand, the block is free to slide and change its position as necessary to accommodate variations in the spacing d (see FIG. 1) produced by thermal effects.

Figure 2B:
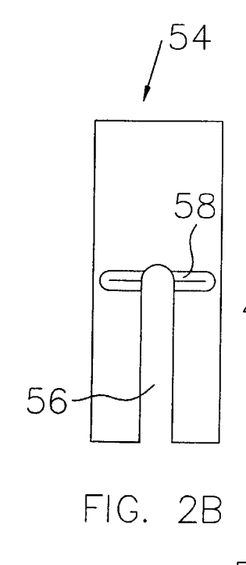
FIG. 2B is a top plan view of the clip seen in FIG. 2.
Figure 4:
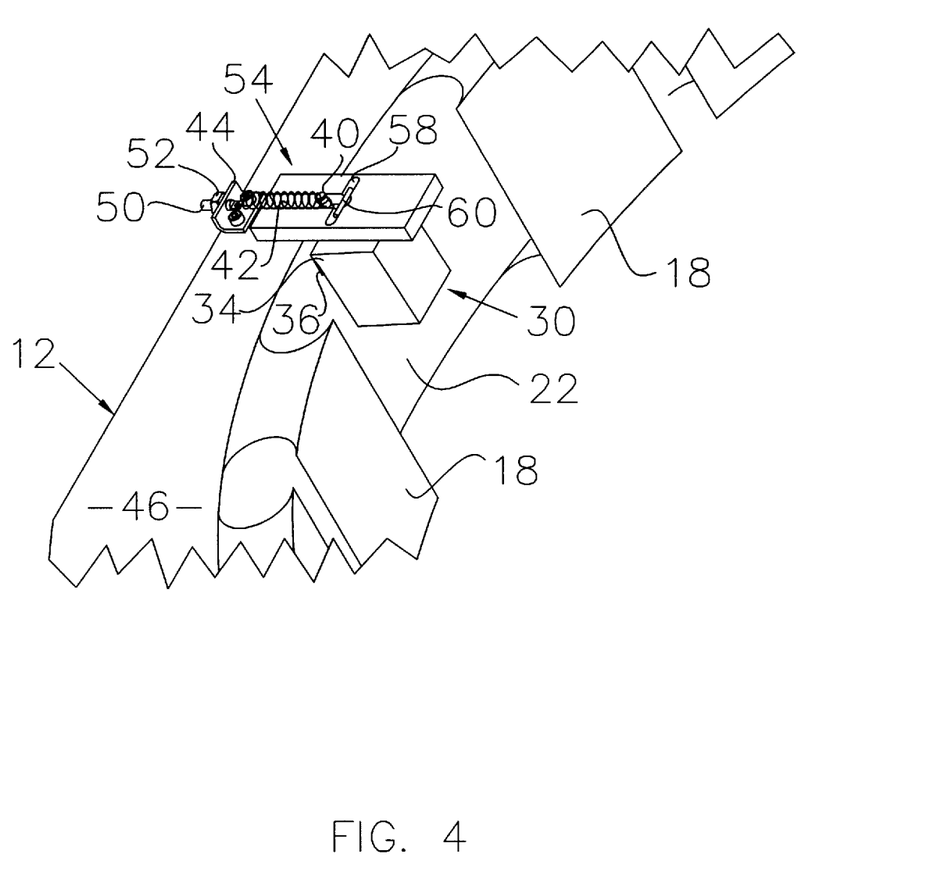
FIG. 4 illustrates in perspective view a portion of the cell with the clip of the invention mounted on the cell's side surface.
Figure 5:
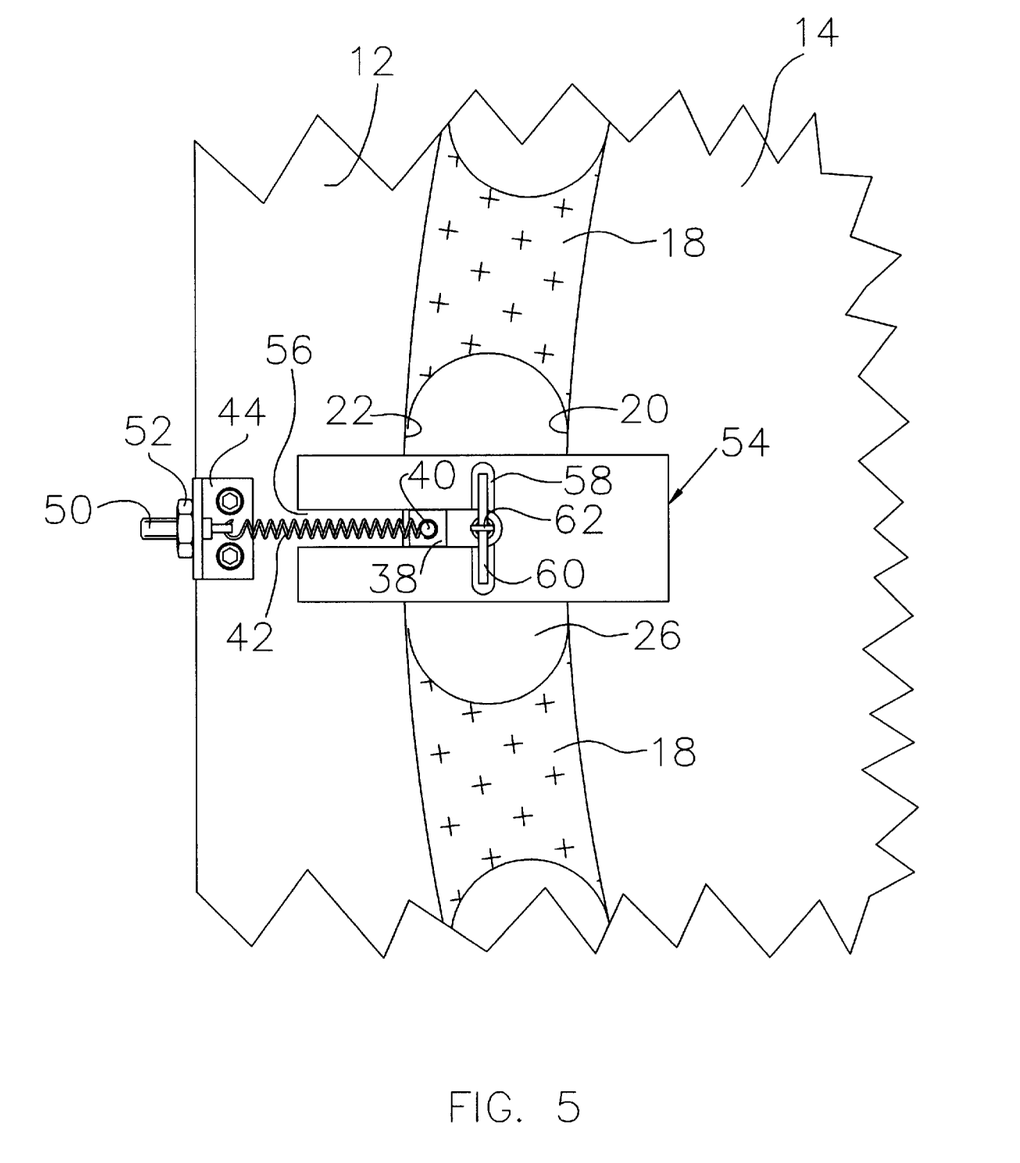
FIG. 5 illustrates in plan view a portion of the cell and flat assembly with the clip of the invention mounted on the cell and flat surfaces.

The second frictional connector consists of the clip 54 (also seen in top plan view in FIG. 2B) and a spring arrangement designed to keep it in surface contact with the optical flat and the cell. The clip 54 contains an open slot 56 sufficiently wide to freely house the post 40 and the corresponding spring 42 without interference with their operation. A retaining groove 58 is provided to stably retain in place a pin 60 attached to one end of an expansion spring 62 pulling the clip 54 toward the outer surface 46 of the cell 12 and the outer surface 64 of the optical flat 14 (see FIG. 2). The spring 62 is positioned in the longitudinal perforation 32 of the block 30 and is anchored to the block by means of a threaded bolt and nut combination 66,68 that permit the adjustment of the spring tension and, correspondingly, of the pressure and frictional forces exerted by the clip 54 on the cell 12 and flat 14. It is noted that the engagement of the lip 34 in the groove 36 prevents the axial movement of the block 30 that could otherwise occur as a result of the pulling action of spring 62. Therefore, this spring compresses the clip 54 against the outer surfaces of the cell and flat, thereby creating a frictional engagement between the two that prevents relative shifts in the radial direction. In addition, the spring 62 also contributes to the frictional forces between the block 30 and the flat's surface 20 because of the pivotal arrangement provided by the engagement of the lip 34 in the groove 36. It is noted that the spring 62 alone, if sufficiently stiff, could provide all the compressive force necessary to both tilt the block 30 against the surface 20 of the flat and compress the clip 54 against the side surfaces of the cell and flat. In the preferred embodiment, though, two springs are used. Thus, the block 30 and clip 54, in combination, provide a frictional connection between the cell 12 and the flat 15 that is substantially rigid with respect to perturbations that cause vibrations in either structure. At the same time, the frictional connection does not in any way affect the spacing between the cell and flat, and the function of the bonds 18 in compensating for shifts caused by thermal effects. FIG. 4 illustrates in perspective view the clip 54 of the invention mounted on the cell 12, as seen prior to assembly with a flat 14. FIG. 5 shows in plan view a portion of the cell and flat assembly with the clip of the invention mounted on the cell and flat surfaces.

Given the relatively small temperature range of interest for interferometric applications (at most about 10° C. above or below room temperature), the thermal shifts involved in the optics components are measured in microns. Accordingly, the various' parts must be machined to commensurate tolerances to ensure the proper functioning of the invention. Obviously, the block 30 must be sized to fit within the gap d with sufficient free space to account for thermal expansion under worst thermal conditions.

In addition, the line contact between the block 30 and the flat 14, the surface contact between the clip 54 and the flat and cell, and the tension of springs 42 and 62, in combination, must be such as to provide sufficient frictional engagement among the parts to constitute a rigid connection under normal perturbation conditions. For example, for a cell/flat combination with the dimensions given above, we found that optimal performance was obtained with a block 30 approximately 34.5 mm long, 25.4 mm wide, and 25.9 mm high (in the radial direction when in place). The lip 34 protruded radially about 1.2 mm and the conforming groove 36 was about 26.2 mm wide and 3.2 mm deep with a bottom surface at a 20° angle with respect to the cell's surface 22 in the axial direction. The clip 54 was about 63.5 mm long and 25.4 mm wide, with a slot 56 about 33.0 mm long and 6.5 mm wide. The springs 42 and 62 were Part No. E-0180-022-1120-S by the Associated Spring Raymond Company of Corry, Pa., with a spring constant of 42.7 gm/mm.

Figure 6:
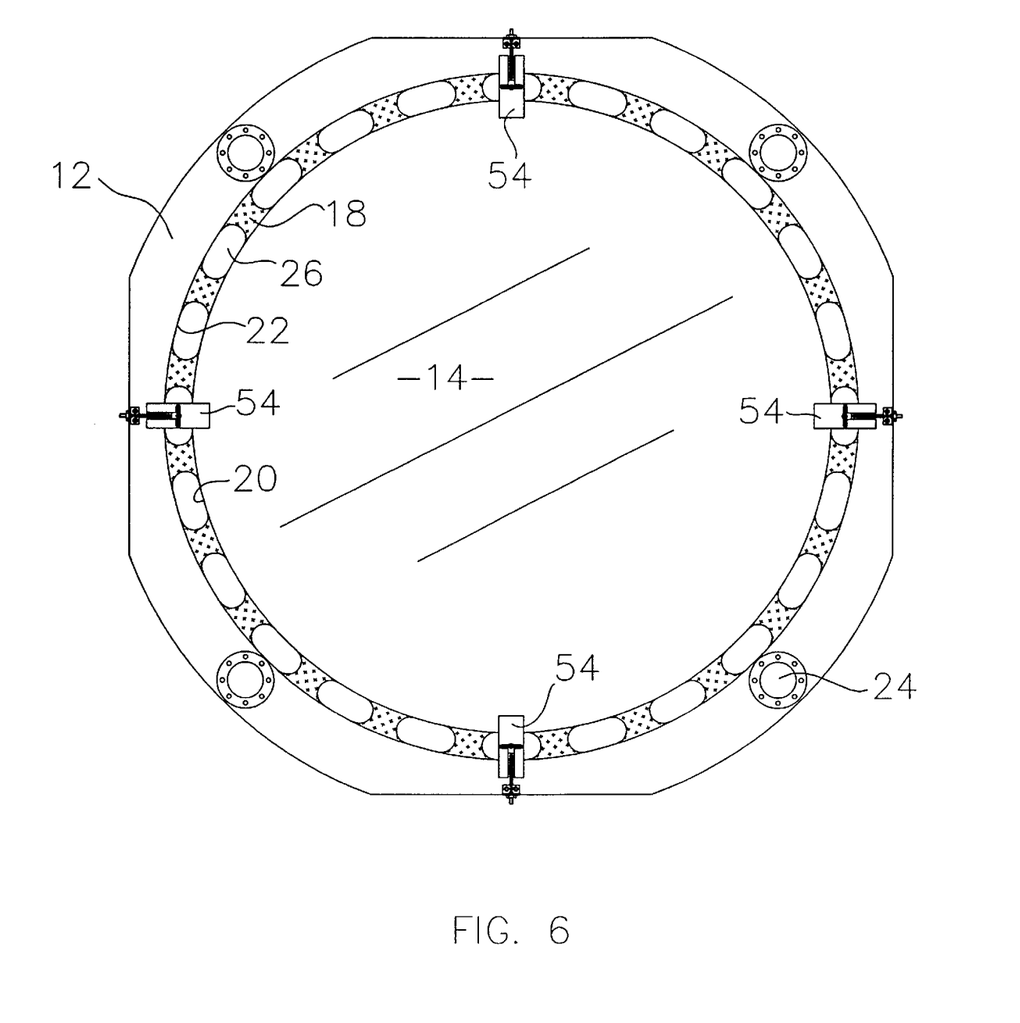
FIG. 6 illustrates in plan view the friction connectors of the invention assembled in conventional cell/flat hardware.

FIG. 6 illustrates in plan view the friction connectors of the invention assembled in conventional cell/flat hardware. Four devices positioned equidistantly along the perimeter of the flat are preferred, but the invention could be usefully practiced with as few as three, and even two in a system with perfectly balanced forces. Obviously, optimal balancing of the forces acting on the cell and flat would always require that the friction connector sets be evenly distributed along the perimeter of the flat.

Various changes in the details, steps and components that have been described may be made by those skilled in the art within the principles and scope of the invention herein illustrated and defined in the appended claims. For example, the preferred embodiment of the invention is based on a block/clip combination of parts, but this configuration could be modified with equivalent results so long as a rigid component engaged frictionally the cell and the flat with sufficient force to rigidly transmit vibrations between the two (and therefore prevent relative vibratory displacements) without interfering with the ability of the cell and flat to adjust for thermal expansion and contraction free of mechanical stresses.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A device for providing a rigid frictional connection between an optical flat and a corresponding supporting cell attached by a resilient bond in optical equipment, the device comprising:
   (a) a rigid solid connector comprising a block adapted to engage said optical flat in frictional connection and a clip adapted to engage said supporting cell in frictional connection; and
   (b) a first spring urging the block against a first surface of the optical flat, and a second spring urging the clip against a second surface of the optical flat and against a surface of the cells;
   such as to produce a frictional engagement sufficient to prevent slippage between said block and said first surface of the optical cell when either the optical flat or the cell is subjected to accelerations produced by environmental vibrations.

2. The device of claim 1, wherein said first and second springs consist of extension springs.

3. The device of claim 2, wherein said block is pivotally coupled to the cell and said first spring tilts the block against the first surface of the optical flat, and said second spring is coupled to the block.

4. The device of claim 3, wherein said block is positioned within a gap between the supporting cell and said first surface of the optical flat, and wherein the clip is positioned in overlapping disposition between said surface of the supporting cell and said second surface of the optical flat.

5. Apparatus for coupling an optical flat and a supporting cell in an optical device, comprising the following combination of components:
   (a) resilient means for bonding the optical flat to the supporting cell;
   (b) a rigid solid connector comprising a block adapted to engage said optical flat in frictional connection and a clip adapted to engage said supporting cell in frictional connection; and
   (c) a first spring urging the block against a first surface of the optical flat, and a second spring urging the clip against a second surface of the optical flat and against a surface of the cells;
   such as to produce a frictional engagement sufficient to prevent slippage between said block and said first surface of the optical cell when either the optical flat or the cell is subjected to accelerations produced by environmental vibrations.

6. The apparatus of claim 5, wherein said first and second springs consist of extension springs.

7. The apparatus of claim 6, wherein said block is pivotally coupled to the cell and said first spring tilts the block against the first surface of the optical flat, and said second spring is coupled to the block.

8. The apparatus of claim 7, wherein said block is positioned within a gap between the supporting cell and said first surface of the optical flat, and wherein the clip is positioned in overlapping disposition between said surface of the supporting cell and said second surface of the optical flat.

9. The apparatus of claim 8, wherein said resilient means comprises vulcanized rubber bonds and wherein at least two sets of said combination of block, clip and springs are mounted uniformly spaced along the perimeter of the optical flat.

10. A method for preventing vibrations between an optical flat and a supporting cell attached by a resilient bond in optical equipment, wherein each of said optical flat and supporting cell has a surface suitable for frictional engagement, comprising the following steps:
   (a) engaging a first surface of the optical flat with a block adapted to mate in frictional engagement therewith;
   (b) engaging a second surface of the optical flat and a surface of the supporting cell with a clip adapted to mate in frictional engagement therewith; and
   (c) applying a force to said block with an elastic member so as to produce a frictional engagement sufficient to prevent slippage between said block and said first surface of the optical flat when either the optical flat or the supporting cell is subjected to vibrations;
   wherein said elastic member consists of a first spring urging the block against said first surface of the optical flat, and of a second spring urging the clip against said second surface of the optical flat and against said surface of the cell.

11. The method of claim 10, wherein said first and second springs consist of extension springs.

12. The method of claim 11, wherein said block is pivotally coupled to the cell and said first spring tilts the block against the first surface of the optical flat, and said second spring is coupled to the block.

13. The method of claim 12, wherein said block is positioned within a gap between the supporting cell and said first surface of the optical flat, and wherein the clip is positioned in overlapping disposition between said surface of the supporting cell and said second surface of the optical flat.

14. A device for providing a rigid frictional connection between a first component and a second component attached by a resilient bond, the device comprising:

(a) a block adapted to engage a first surface of the first component;

(b) a clip adapted to engage a second surface of the first component and a surface of the second component;

(c) a first spring urging the block against said first surface of the first component; and (d) a second spring urging the clip against said second surface of the first component and against said surface of the second component;

such as to produce a frictional engagement sufficient to prevent relative movement between the two components when either component is subjected to accelerations produced by environmental vibrations.

15. The device of claim 14, wherein said first and second springs consist of extension springs.

16. The device of claim 15, wherein said block is pivotally coupled to the second component and said first spring tilts the block against the first surface of the first component, and said second spring is coupled to the block.

17. The device of claim 16, wherein said block is positioned within a gap between the second component and said first surface of the first component, and wherein the clip is positioned in overlapping disposition between said surface of the second component and said second surface of the first component.

18. A method for preventing vibrations between a first component and a second component attached by a resilient bond, wherein each of said components has surfaces suitable for frictional engagement, comprising the following steps:

(a) engaging a first surface of said first component with a block adapted to mate in frictional engagement therewith;

(b) engaging a second surface of the first component and a surface of the second component with a clip adapted to mate in frictional engagement therewith;

(c) urging the block against said first surface of the first component with a first elastic means; and (d) urging the clip against said second surface of the first component and against said surface of the second component with a second elastic means;

so as to produce a frictional engagement sufficient to prevent relative movement between the two components when either component is subjected to vibrations.

19. The method of claim 18, wherein said first and second springs consist of extension springs.

20. The method of claim 19, wherein said block is pivotally coupled to the second component and said first spring tilts the block against the first surface of the first component, and said second spring is coupled to the block.

21. The method of claim 20, wherein said block is positioned within a gap between the second component and said first surface of the first component, and wherein the clip is positioned in overlapping disposition between said surface of the second component and said second surface of the first component.

* * * * *

UNITED STATES PATENT AND TRADEMARK OFFICE
CERTIFICATE OF CORRECTION

PATENT NO. : 5,822,136

DATED : October 13, 1998

INVENTOR(S) : Semrad et al.

It is certified that error appears in the above-identified patent and that said Letters Patent is hereby corrected as shown below:

In Claim 1, column 5, line 65, replace the word "cells" with --cell--

In Claim 5, column 6, line 27, replace the word "cells" with --cell--

Signed and Sealed this

Twelfth Day of January, 1999

Attest:

Attesting Officer

*Acting Commissioner of Patents and Trademarks*